United States Patent
Hamlet

(10) Patent No.: US 10,693,661 B1
(45) Date of Patent: Jun. 23, 2020

(54) DYNAMIC SIGNATURE GENERATION FROM KEYSTROKE DYNAMICS

(71) Applicant: National Technology & Engineering Solutions of Sandia, LLC, Albuquerque, NM (US)

(72) Inventor: Jason Hamlet, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 258 days.

(21) Appl. No.: 15/801,646

(22) Filed: Nov. 2, 2017

Related U.S. Application Data

(60) Provisional application No. 62/444,906, filed on Jan. 11, 2017.

(51) Int. Cl.
*H04L 9/32* (2006.01)
*G06F 21/31* (2013.01)

(52) U.S. Cl.
CPC ............ *H04L 9/3247* (2013.01); *G06F 21/31* (2013.01)

(58) Field of Classification Search
CPC .............................. H04L 9/3247; G06F 21/31
USPC ........................................................ 713/180
See application file for complete search history.

(56) References Cited

U.S. PATENT DOCUMENTS

| | | | |
|---|---|---|---|
| 8,136,154 B2 | 3/2012 | Phoha et al. | |
| 8,332,932 B2 | 12/2012 | Kellas-Dicks et al. | |
| 8,516,557 B2 | 8/2013 | Jin | |
| 9,329,699 B2* | 5/2016 | Allen | G06F 3/023 |
| 9,477,823 B1* | 10/2016 | Ott | G06F 21/316 |
| 10,121,049 B2* | 11/2018 | Apostolos | H04M 1/673 |
| 10,200,360 B2* | 2/2019 | Draluk | G06F 21/00 |
| 2006/0242424 A1* | 10/2006 | Kitchens | G06F 21/316 |
| | | | 713/183 |
| 2006/0271790 A1* | 11/2006 | Chen | G06F 21/32 |
| | | | 713/185 |
| 2006/0280339 A1* | 12/2006 | Cho | G07C 9/37 |
| | | | 382/115 |
| 2008/0091453 A1* | 4/2008 | Meehan | G06Q 20/341 |
| | | | 705/317 |
| 2008/0098456 A1* | 4/2008 | Alward | G06F 21/316 |
| | | | 726/1 |
| 2009/0150437 A1* | 6/2009 | De Los Reyes | G06Q 50/18 |
| 2013/0326604 A1* | 12/2013 | Hird | G06F 21/32 |
| | | | 726/7 |
| 2015/0169854 A1* | 6/2015 | Chang | G06F 21/32 |
| | | | 340/5.85 |

(Continued)

OTHER PUBLICATIONS

Araujo, et al., "User Authentication Through Typing Biometrics Features", IEEE Transactions on Signal Processing, vol. 53, No. 2, Feb. 2005, pp. 851-855.

(Continued)

*Primary Examiner* — Shin-Hon (Eric) Chen
*Assistant Examiner* — Dereena T Cattungal
(74) *Attorney, Agent, or Firm* — Madelynne J. Farber; Mark A. Dodd

(57) ABSTRACT

Described herein are various technologies pertaining to extracting cryptographic keys from user behavioral biometrics, specifically keystroke dynamics. Such cryptographic keys can be used for, among other things, user authentication throughout computer sessions. Keystroke dynamics are timing data indicating when keys were pressed and when they were released.

20 Claims, 10 Drawing Sheets

(56) References Cited

U.S. PATENT DOCUMENTS

| | | | |
|---|---|---|---|
| 2015/0358317 A1* | 12/2015 | Deutschmann | H04W 12/0609 713/186 |
| 2016/0253486 A1* | 9/2016 | Sarkar | G06F 21/316 726/7 |
| 2018/0129413 A1* | 5/2018 | Berger | G06F 3/0238 |
| 2019/0200583 A1* | 7/2019 | Simoes Alves Vieira | A01K 61/10 |
| 2019/0220583 A1* | 7/2019 | Douglas | G06F 21/316 |

OTHER PUBLICATIONS

Joyce, et al., "Identity Authentication Based on Keystroke Latencies", Communications of the ACM, vol. 33, No. 2, Feb. 1990, pp. 168-176.

* cited by examiner

DYNAMIC SIGNATURE GENERATION FROM KEYSTROKE DYNAMICS

RELATED APPLICATION

This application claims priority to U.S. Provisional Patent Application No. 62/444,906 filed on Jan. 11, 2017, and entitled "DYNAMIC KEY GENERATION FROM KEYSTROKE DYNAMICS", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Authentication of users during computing sessions ensures the security of electronic systems, and can reduce the risk of subversion of such systems by unauthorized users. Certain user authentication methods are already known such as usernames and passwords or fingerprint scans, but none of these methods are without flaws. Usernames and passwords can be hacked, oftentimes readily. Fingerprint scans require hardware that is configured to acquire the fingerprint scan, and requesting a fingerprint scan while a user is working is intrusive and may interrupt the user's task. Moreover, other authentication techniques, such as facial recognition, may be invasive to some users, due to the fact that a camera must capture an image of the user and his or her surroundings to perform facial recognition. Finally, there are currently no suitable techniques for continuously authenticating a user while the user employs a computing device; thus, if the user were to momentarily leave the computing device unattended, a malicious user may employ the computer to perform some nefarious act, as, once initially authenticated, the computing device effectively presumes the intended user continues to employ the computing device.

SUMMARY

The following is a brief summary of subject matter that is described in greater detail herein. This summary is not intended to be limiting as to the scope of the claims.

Described herein are various technologies pertaining to authentication of users based upon behavioral biometrics such as keystroke dynamics. Keystroke timing information from a set of input patterns can be used to establish cryptographic keys from keystroke dynamics. The set of patterns can be user specific, need not be known by the user, and can change over time. The set itself can be treated as public information, and does not need to be protected as a secret. The timing information extracted from this set can be used to generate a bitstream, where a cryptographic key for the user can be generated based upon the bitstream. In another example, the bitstream can be used in conjunction with a fuzzy extractor to generate a cryptographic key for the user. A computing system monitors the actions of a user as the user types on the keyboard and identifies certain patterns unique to that user's behavioral biometrics to generate a signature (e.g., cryptographic key) based upon the keystroke data. The patterns in the keystroke data are converted into a bitstream and compared to the user's larger data set to confirm user identity. Then, as described above, the bitstream can either be used as the password itself or be passed through a fuzzy extractor prior to being compared to the original key.

Specifically, the keystroke dynamics utilized to generate the signature key include: (1) press to press time, which is the amount of time between when one key is pressed by a user and when an immediately subsequent key is pressed by the user (e.g., an amount of time between when the "t" key is pressed and when the "h" key is pressed when the user is typing the word "the"); (2) press to release time, which is the amount of time between when one key is pressed by the user and when an immediately subsequent key is released by the user (e.g., an amount of time between when the "t" key is pressed and when the "h" key is released when the user is typing the word "the"); (3) release to press time, which is the amount of time between when one key is released by the user and when an immediately subsequent key is pressed by the user (e.g., an amount of time between when the "t" key is released and when the "h" key is pressed when the user is typing the word "the"); and (4) release to release time, which is the amount of time between when one key is released by a user and when an immediately subsequent key is released by the user (e.g., an amount of time between when the "t" key is released and when the "h" key is released when the user is typing the word "the"). Each of these sets of patterns can then be compared to an average data point to generate the bitstream. For example, if a user's press to press time for moving from the "A" key to the "Z" key is 0.5 milliseconds and the average time is 0.4 milliseconds, the bitstream would read "1" for that data point since the user takes longer than average.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
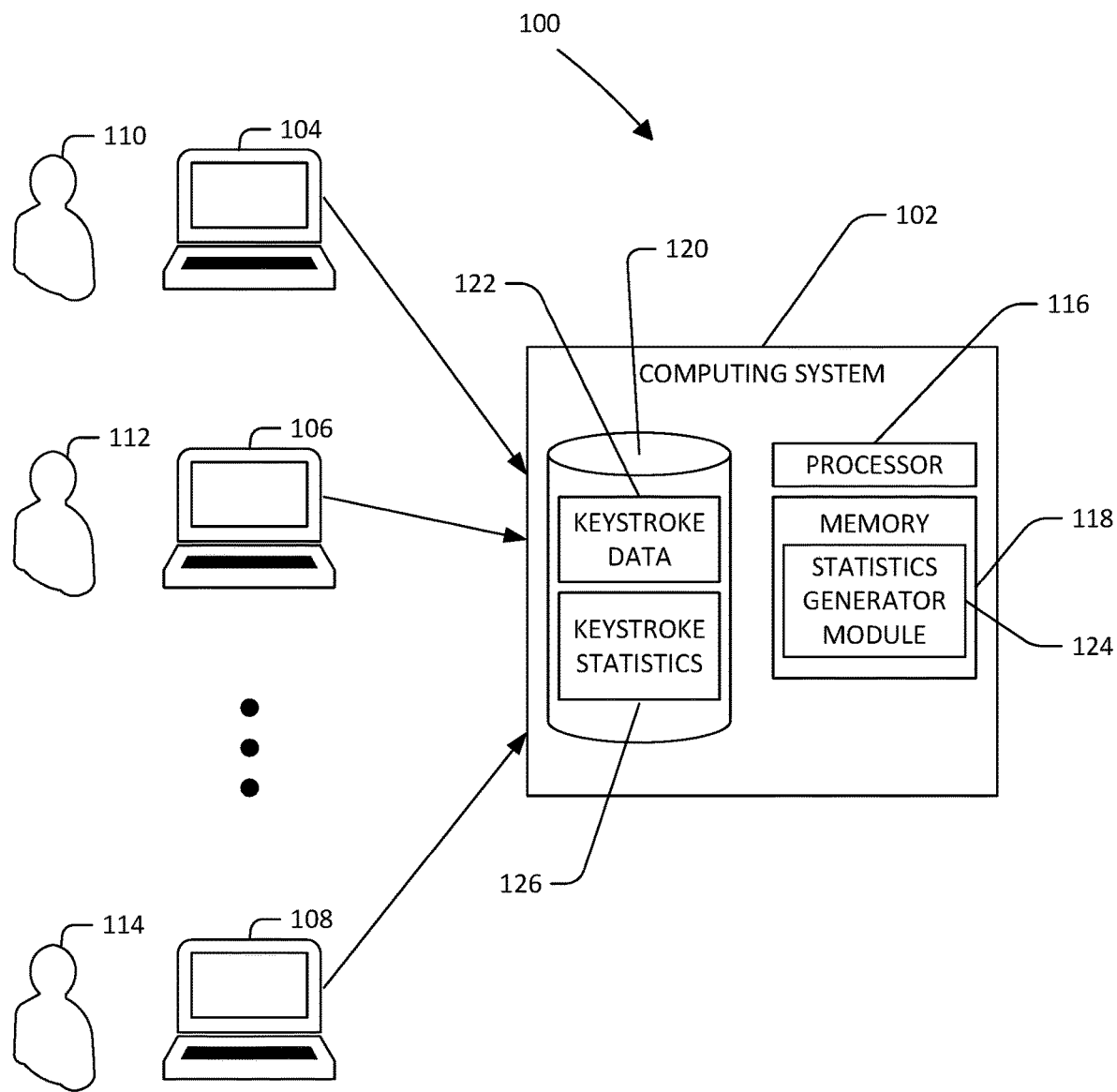
FIG. 1 is a functional block diagram of an exemplary system that facilitates generation of keystroke signature via compilation of user keystroke data to compare to statistical averages.

Various technologies pertaining to user authentication using keystroke dynamics are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in flow diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Described herein are various technologies pertaining to authenticating a user based upon timing data associated with keystrokes set forth by the user as the user is typing on a keyboard. With more particularity, timing data for user typing has been identified as being a behavioral biometric that is usable to identify, and thus authenticate, the user. For instance, combinations of press to press time, press to release time, release to press time, and release to release time between keys on a keyboard can be a behavioral biometric for a user that is unable to be readily mimicked. Described herein are techniques for identifying such a behavioral dynamic, and also described herein are techniques for authenticating users based upon such behavioral biometric.

Referring now to FIG. 1, an exemplary system 100 is illustrated, wherein the system 100 is configured to generate keystroke patterns statistics, which can subsequently be used to create behavioral biometric signatures for users. The system 100 comprises a computing system 102 and a plurality of client computing devices 104-108 that are in network communication with the computing system 102, where users 110-114 respectively operate the client computing devices 104-108. The computing system 102 can be or include a server computing device or a plurality of server computing devices. The client computing devices 104-108 can be desktop computing devices, laptop computing devices, or other suitable computing devices where keyboards are employed as input interfaces.

Each of the client computing devices 104-108 has keystroke logging software (e.g., a keystroke logger) installed thereon that logs keystrokes set forth by the users 110-114. The keystroke logger is configured to generate a keystroke log that includes the following information: 1) a sequence of keys pressed by the user; 2) for each key pressed by a user, a) a timestamp that identifies a time when the key was pressed; and b) a timestamp that identifies when the key was released. Therefore, for the sequence of keys "a→s", the keystroke logger can log the following information: [(key: "a"; press time: "time 1"; release time: "time 2") (key: "s"; press time: "time 3"; release time: "time 4")]. Accordingly, each of the client computing devices 104-108 generates a keystroke log that comprises such information. The client computing devices transmit these keystroke logs to the computing system 102.

The computing system 102 comprises a processor 116, memory 118, and a data store 120. The computing system 102 receives the keystroke logs from the client computing devices 104-108, whereupon the keystroke logs are retained in the data store 120 as user keystroke data 122. In an exemplary embodiment, the computing system 102 may be a client computing device, and one or more acts described below as being performed by the computing system 102 may be performed by a client computing device. The memory 118 includes a statistics generator module 124 that is configured to compute keystroke pattern statistics 126 using the keystroke data 122, wherein the keystroke pattern statistics 126 are stored in the data store 120. More specifically, the statistics generator module 124 computes average times for keystroke patterns in the keystroke data. A keystroke pattern has one of the following four forms: (key 1 ID, key 2 ID, time between when key 1 was pressed and key 2 was pressed); (key 1 ID, key 2 ID, time between when key 1 was pressed and key 2 was released); (key 1 ID, key 2 ID, time between when key 1 was released and key 2 was pressed); and (key 1 ID, key 2 ID, time between when key 1 was released and key 2 was released), wherein key 2 is adjacent to key 1 in a key sequence logged by a key logger. Other patterns are also contemplated—for instance, a keystroke pattern can include more than two keys pressed in sequence. In another example, a pattern may pertain to when a single key was pressed and released. The statistics generator module 124, utilizing the keystroke data 120, can compute average times for each pattern observed in the keystroke data 120. Accordingly, an exemplary pattern in the keystroke statistics can have the following form: (key 1 ID, key 2 ID, type, time), where "type" indicates whether the pattern is press to press, press to release, release to press, or release to release, and the time is the average time for such pattern.

Figure 2:
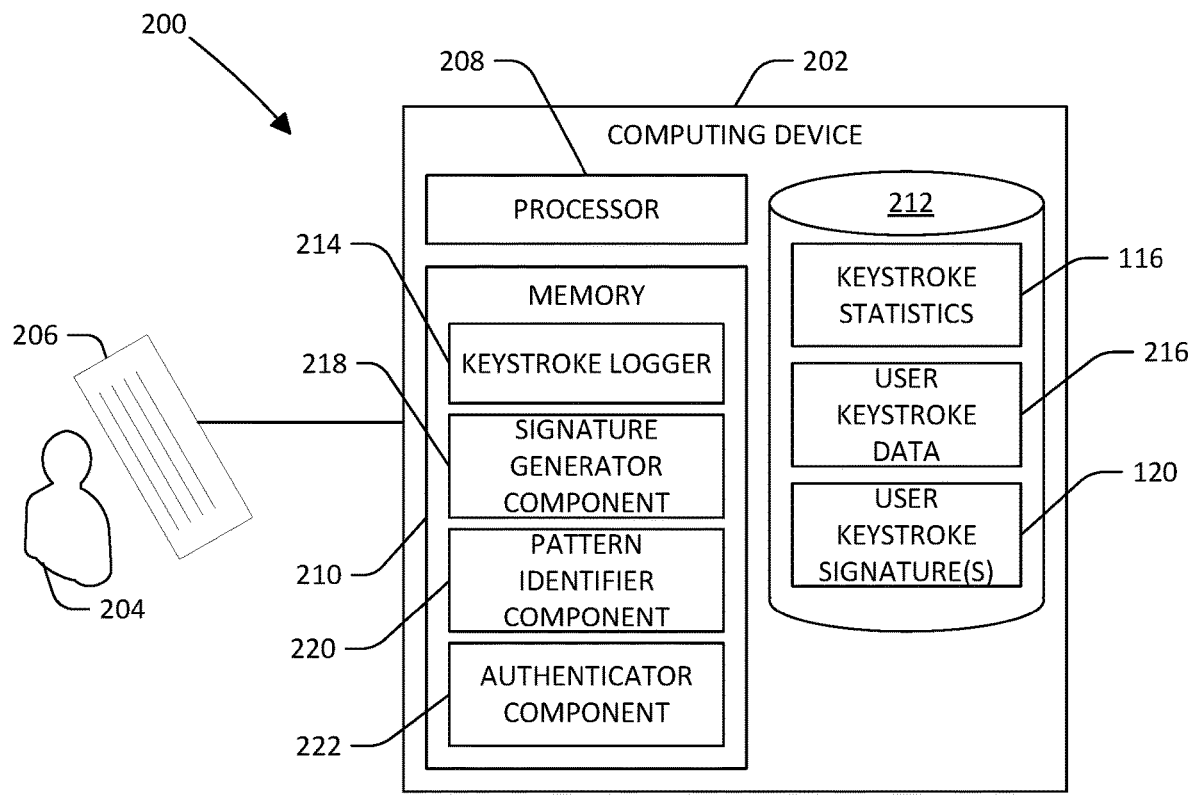
FIG. 2 is a functional block diagram of an exemplary system that facilitates generation of keystroke signature via compilation of user keystroke data via logging of specific keystrokes and identifying patterns.

With reference now to FIG. 2, an exemplary system 200 that is configured to generate a signature for a user based upon keystroke dynamics is illustrated. The system 200 comprises a client computing device 202 that is operated by a user 204, wherein the client computing device 202 has a keyboard 206 in communication therewith. While the client computing device 202 is depicted as including several components, it is to be understood that one or more of such components may be included in server computing device (not shown) that is in network communication with the client computing device 200. The client computing device 202 receives input from the user 204 via the keyboard 206. The client computing device 202 comprises a processor 208 and memory 210, wherein the memory stores instructions that are executed by the processor 208. Further, the client computing device 202 includes a data store 212, wherein the data store retains the keystroke statistics 126 (e.g., average times for various keystroke patterns). The memory 210 comprises a keystroke logger 214 that generates a keystroke log based upon typing of the user 204. The keystroke log generated by the keystroke logger 214 includes the same type of information included in the keystroke logs provided to the computing system 102 by the computing devices 104-108, and can be retained in the data store 212 as user keystroke data 216.

The memory 210 further includes a signature generator component 218 that is configured to generate a signature for the user 204 that can subsequently be employed to authenticate the user, wherein the signature generator component 212 generates the signature based upon the keystroke statistics and the user keystroke data 216. The signature generator component 218, when generating the signature, performs the following actions: 1) computes statistics for keystroke patterns in the user keystroke data 216 (where the statistics can include an average time, and the patterns can include press to press, press to release, release to press, and/or release to release, as described above); 2) compares, for each keystroke pattern for which statistics have been computed, a) the statistics for the keystroke pattern with b) corresponding statistics for the keystroke pattern from the keystroke statistics 116; 3) identifies a set of keystroke patterns (e.g., a threshold number of keystroke patterns) where differences between the compared statistics are greatest; and 4) generates a bitstream based upon the differences between the compared statistics.

Figure 3:
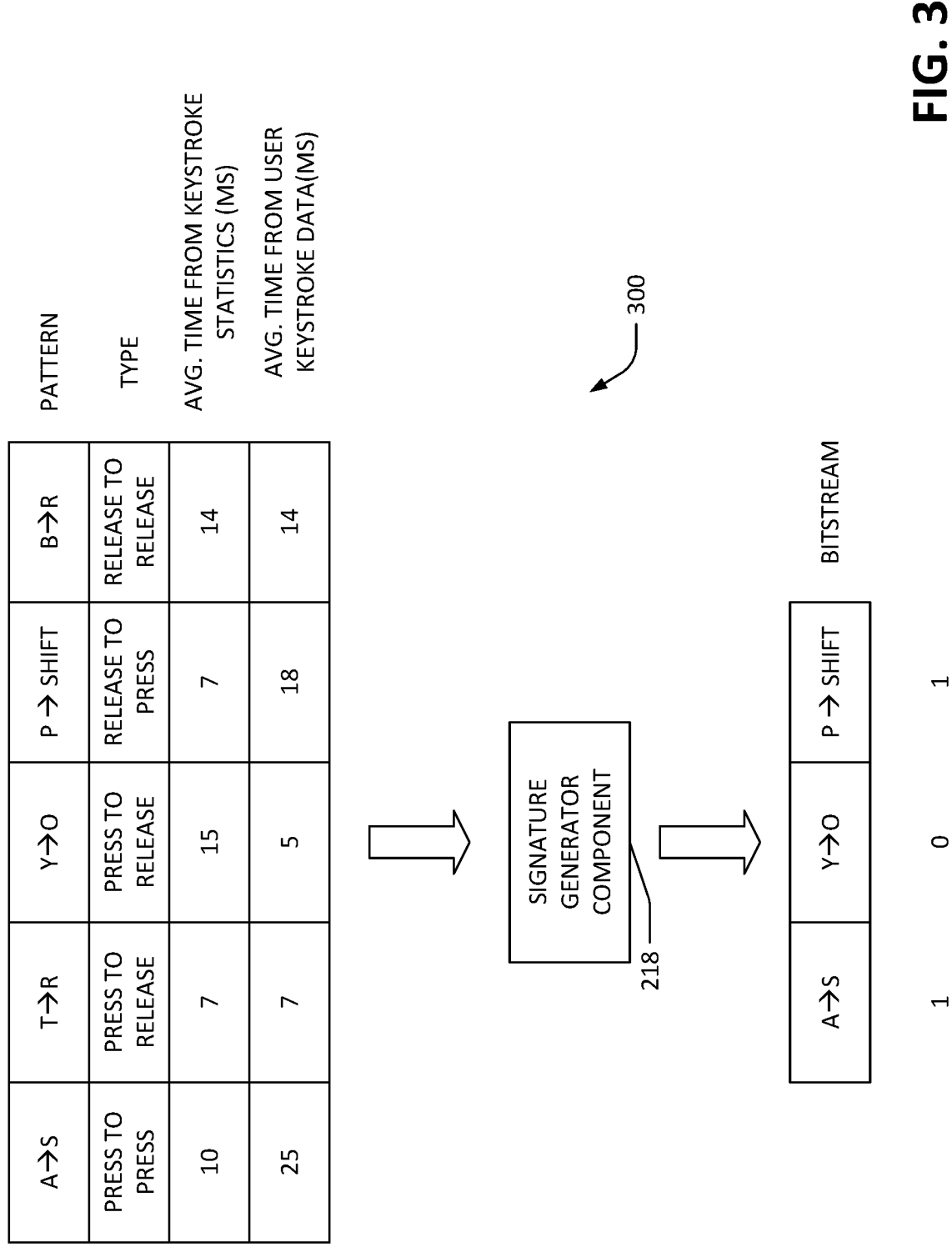
FIG. 3 is a schematic that illustrates creation of a bitstream.

Referring briefly to FIG. 3, a schematic that depicts creation of a bitstream by the signature generator component 218 is illustrated. With respect to action 1) referenced above, the signature generator component 218 computes average times observed in the user keystroke data 216 the following patterns: press to press time for key sequence A→S (e.g., time between when the user pressed key "A" to when the user pressed key "S" when the user set forth the key sequence A→S); press to release time for key sequence T→R (e.g., time between when the user pressed key "T" to when the user pressed key "R" when the user set forth the key sequence T→R); press to release time for key sequence Y→O (e.g., time between when the user pressed key "Y" to when the user released key "O" when the user set forth the key sequence Y→O); release to press time for key sequence P→SHIFT (e.g., time between when the user released key "P" to when the user pressed key "SHIFT" when the user set forth the key sequence P→SHIFT); and release to release time for key sequence B→R (e.g., time between the user released key "B" to when the user released key "R" when the user set forth the key sequence B→R). In the example depicted in FIG. 3, table 300 illustrates that the average times for the user 204 for these patterns are 25, 7, 5, 18, and 14 milliseconds, respectively. In an exemplary embodiment, the signature generator component 218 computes average time for a pattern only if the pattern is included in the user keystroke data 216 a threshold number (e.g., five or more) times. The table 300 also illustrates that the average times for a larger population (from the keystroke statistics 116) for the patterns are 10, 7, 15, 7, and 14 milliseconds, respectively.

With respect to action 2), the signature generator component 218 compares, for each keystroke pattern for which statistics have been computed, the time difference for corresponding keystroke statistics for the user 204 and the larger population (e.g., users 110-114). For example, the signature generator component 218 can ascertain that there is a 10 ms difference between the average press to press time for key sequence A→S for the user 204 and the average press to press time for the key sequence A→S for the larger population, and that there is a 0 ms difference between the average press to release time for key sequence T→R for the user 204 and the average press to release time for the key sequence T→R for the larger population.

Based upon such comparison, and with reference to action 3) noted above, the keystroke generator component 118 identifies a set of patterns to use when generating the signature for the user 204, where keystroke dynamics for patterns in the set of patterns is likely to be unique to the user 204. The signature generator component 118 identifies the set of patterns based upon the comparisons referenced above. For instance, the signature generator component 118 can identify the press to press time for key sequence A→S as being a pattern for use when generating the signature for the user 204, as a difference (10 ms) between the user statistics for such pattern and the population statistics for such pattern is relatively large. Contrarily, the signature generator component 118 can determine that the press to release time for the key sequence T→R should not be used when generating a signature for the user 204, as a difference (0 ms) between the user statistics for such pattern and the population statistics for such pattern do not differ; hence, it can be inferred that the press to release time for the key sequence T→R is not well-suited for use when generating a signature that is to uniquely and reliably identify the user 204. In the example depicted in FIG. 3, the signature generator component 118 has identified that the following patterns are to be used when generating the signature for the user: press to press time for key sequence A→S, press to release time for key sequence Y→O, and the release to press time for key sequence P→SHIFT, due to the relatively large differences between the statistics for such patterns. Generally, the signature generator component 218 can identify some threshold number of patterns (e.g., 200 patterns) that are well-suited for a signature for the user 204 based upon differences between user statistics for the patterns and population statistics for the patterns.

Referring to action 4), the signature generator component 118 generates a bitstream using the identified patterns and user and population statistics for such patterns. For example, for each pattern identified by the signature generator component 118 for use when generating the signature, the signature generator component 118 can determine whether the pattern statistic (average time) for the user 204 is greater than or less than the pattern statistic (average time) for the population. When, for a pattern, the pattern statistic for the user 204 is greater than the pattern statistic for the population, the signature generator component 118 can assign a value of "0" to the pattern, while when, for the pattern, the pattern statistic for the user 204 is less than the pattern statistic for the population, the signature generator component 118 can assign a value of "1" to the pattern. Thus, the signature generator component 118 creates a bitstream, where each bit in the bitstream corresponds to a keystroke pattern. In the example depicted in FIG. 3, the bitstream includes 3 bits: a "1" for the press to press for key sequence A→S, a "0" for the press to release for key sequence Y→O, and a "1" for the release to press for key sequence P→SHIFT. While the bitstream in FIG. 3 is illustrated as including three bits, in practice the bitstream can include several hundred bits. As will be described in greater detail below, the signature generator component 218 can generate a signature for the user 204 based upon the bitstream. For instance, the signature can be a cryptographic key that is generated through use of a fuzzy extractor. In another example, the bitstream itself can be the signature. Other examples are contemplated and are intended to fall within the scope of the hereto-appended claims.

In still more detail, in an exemplary embodiment, as noted above, the signature generator component 218 can generate a signature based upon keystroke timing statistics. The signature generator component 218 can employ the signature to create a public key-private key pair (e.g., such as in RSA or elliptic curve cryptography), and can cause the public key and private key to be stored in the data store 212. As will be described below, during authentication of the user 204, the public key can be employed to authenticate the user 204.

Returning to FIG. 2, the memory 210 additionally comprises a pattern identifier component 220 that is configured to search for patterns used by the signature generator component 218 to generate the signature for the user 204, wherein the patterns are usable to generate an observed signature (which, if the user 204 is the same, should match the signature generated by the signature generator component 218). More specifically, the pattern identifier component 220 is configured to monitor output of the keystroke logger 214 as the user types on the keyboard 206, and identify the patterns upon which the bitstream generated by the signature generator component 218 is based.

Figure 4:
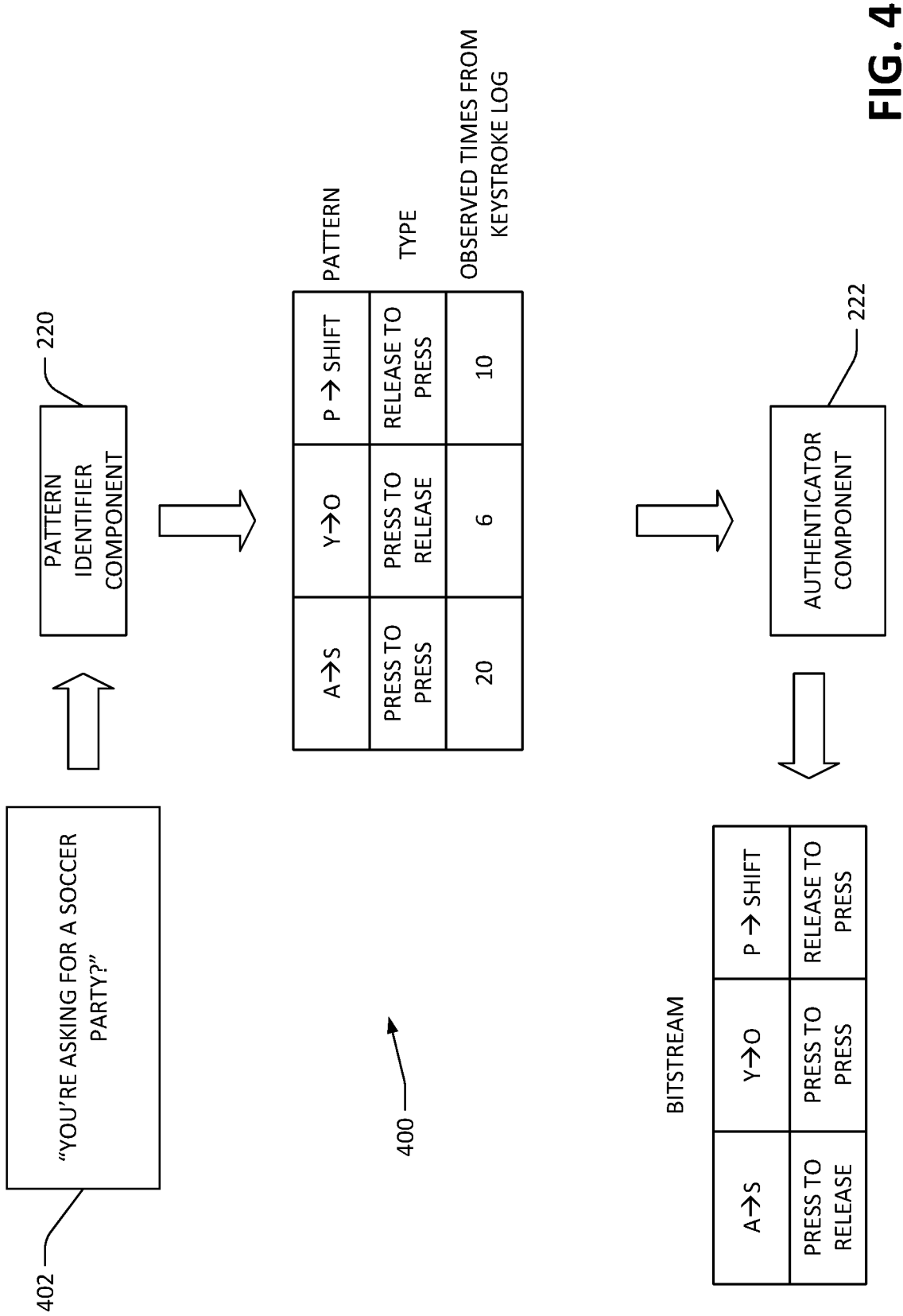
FIG. 4 is a schematic that illustrates creation of a bitstream based upon observed user interaction with keyboard keys.

Referring briefly to FIG. 4, an exemplary operation of the pattern identifier component 220 is depicted. The pattern identifier component 220 observes a user throughout a computing session and recognizes patterns upon which the user signature is based. The pattern identifier component 220 extracts timing information for those patterns from the keystroke log generated by the keystroke logger 214. In the example shown in FIG. 4, a keystroke log 402 output by the keystroke logger 214 includes the sentence "You're Asking for a Soccer Party?", as well as timestamps for each key press and each key release. The pattern identifier component 220, as the user 204 types on the keyboard 206, searches the keystroke log 402 for the patterns A→S, Y→O, and P→SHIFT, and extracts these patterns and associated timing information from the keystroke log 402, where press to press time, press to release time, release to press time, and release to release time can be determined based upon timestamps in the keystroke log 402. The pattern identifier component 220 identifies these patterns in the query log 402, and places times for these patterns in a desired sequence (i.e., the sequence used to create the bitstream). FIG. 4 depicts a table 404, which includes the output of the pattern identifier component 220, wherein the output comprises times for the patterns arranged in the sequence that corresponds to the bitstream generated by the signature generator component 218. The pattern identifier component 220 can update the times as the key sequences are identified in the keystroke log 402. In the specific example of FIG. 4, the pattern identifier component 220 outputs times of 20 ms, 6 ms, and 10 ms for the following patterns, respectively: press to press for key sequence A→S, press to release for key sequence Y→O, and release to press for key sequence P→SHIFT.

Returning again to FIG. 2, the memory 210 additionally includes an authenticator component 222 that receives the output of the pattern identifier component 220 and the signature generated by the signature generator component 218 and authenticates the user 204 based upon the received output and the signature. To authenticate the user 204, the authenticator component 222 generates an observed signature based upon: 1) the timing information output by the pattern identifier component 220; and 2) the keystroke statistics 116. The authenticator component 222 generates the observed signature using the same approach that the signature generator component 218 employs when generating the signature—the authenticator component 222 compares the sequenced timing information (for the above-described patterns) output by the pattern identifier component 222 with the timing information for the patterns in the keystroke statistics 116 and generates a bitstream based upon such comparison. With reference once again to FIG. 4, the authenticator component compares 20 ms, 6 ms, and 10 ms (as output by the pattern identifier component 220) for the three patterns mentioned above with 10 ms, 15 ms, and 7 ms, respectively (from the keystroke statistics 116) for such three patterns.

As shown in FIG. 4, the authenticator component outputs the bitstream "1" "0" "1" based upon such comparison, as 20 ms is greater than 10 ms, 6 ms is less than 15 ms, and 10 ms is greater than 7 ms. As noted above, the bitstream may act as the observed signature, and the authenticator component 222 can compare the observed signature with the previously generated signature for the user 204—if the signatures are equivalent, the authenticator component 222 authenticates the user 204, and does not prevent the user from continuing to operate the computing device 202. If the signatures are not equivalent, the authenticator component 222 can cause at least some functionality of the computing device 202 to become disabled; for instance, the authenticator component 222 can cause a lock screen to be presented on the display of the computing device 202, and request a username and password (or biometric input) from the operator of the computing device 202 (who may not be the user 204).

In another exemplary embodiment, the authenticator component 222 generates a cryptographic key based upon the bitstream utilizing a suitable cryptographic system to generate the observed signature, wherein the signature generator component 218 employed the same cryptographic signature to generate the signature to which the authenticator component 222 compares the observed signature. The authenticator component 222 compares the signature generated by the signature generator component 218 with the observed signature (generated by the authenticator component 222), and authenticates the user 204 based upon the comparison. As noise is a possibility, the authenticator component 222 can employ a fuzzy extractor when generating the observed signature, wherein the fuzzy extractor is configured to remove such noise and allow for a suitable comparison between the signature generated by the signature generator component 218 and the observed signature. In yet another example, the authenticator component 222 can authenticate the user 204 if there is some threshold amount of similarity between the signature generated by the signature generator component 218 and the observed signature (e.g., the authenticator component 222 authenticates the user 204 when there is a 90% or greater match between the two signatures).

Further, as noted above, the signature generator component 218 can generate a public key-private key pair based upon an authentication signature generated by the signature generator component 208. When it is desired to authenticate the user 204, the authenticator component 222 can generate an observed signature for the user 204 based upon observed keystroke dynamics. The authenticator component 222 can then generate a public key—private key pair using the same cryptographic algorithm employed by the signature generator component 218. Thereafter, the authenticator component 222 can initiate a cryptographic authentication. For instance, the authenticator component 222 (which can include or be in communication with a random number generator) can generate or receive a random number, can retrieve the public key from the data store 212, and can encrypt the random number with the public key. The authenticator component 222 can thereafter utilize the newly-generated private key to decrypt the encrypted random number. The authenticator component 222 can subsequently compare the decrypted random number with the generated random number, and if the two match, then the authenticator component 222 authenticates the user 204. As noted previously, the authenticator component 222 can employ a fuzzy extractor when generating the observed signature, as the cryptographic authentication process is not tolerant of noise.

Figure 5:
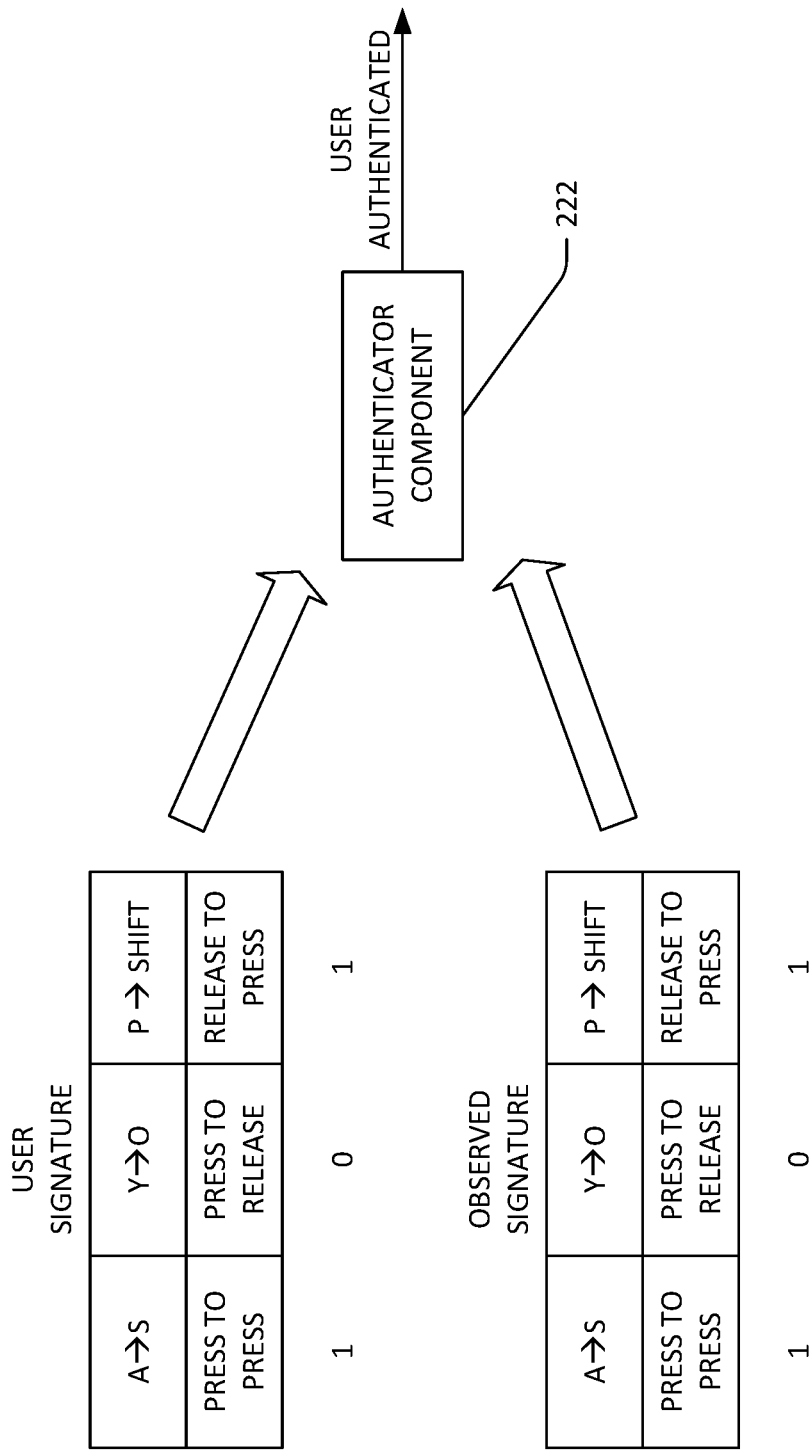
FIG. 5 is a schematic that illustrates authentication of a user based upon a comparison between an observed signature with a user signature.

FIG. 5 is a schematic 500, wherein the bitstreams acts as signatures, and further wherein the authenticator component 222 compares the user signature to the observed signature to confirm that the current user is the authorized user (e.g., to confirm that the user 204 is the person operating the computing device 202. In the example depicted in FIG. 5, the bitstream of the user signature 120 includes 3 bits: a "1" for the press to press for key sequence A→S a "0" for the press to release for key sequence Y→O, and a "1" for the release to press for key sequence P→SHIFT. In the example depicted in FIG. 5, the bitstream of the observed signature 404 includes 3 bits for the same patterns: a "1" for the press to press for the key sequence A→S, a "0" for the press to release for the key sequence Y→O, and a "1" for the release to press for the key sequence P→SHIFT. Thus, both bitstreams (for the user signature 120 generated by the signature generator component 218 and the observed signature 404 generated by the authenticator component 222 are "101", and therefore the authenticator component 222 authenticates the user 204, thereby allowing the user 204 to continue to operate the client computing device 202. If the authenticator component 222 determines that the two signatures do not match, the authenticator component 222 can limit functionality of the client computing device 202 in some way. For example, the authenticator component 222 can "lock" the client computing device 202, and request some other form of authentication from the user 204. In another example, the authenticator component 222 can prevent data from being received at the client computing device 202 and/or can prevent data from being transmitted from the client computing device 202 until the user 204 is authenticated.

Figure 6:
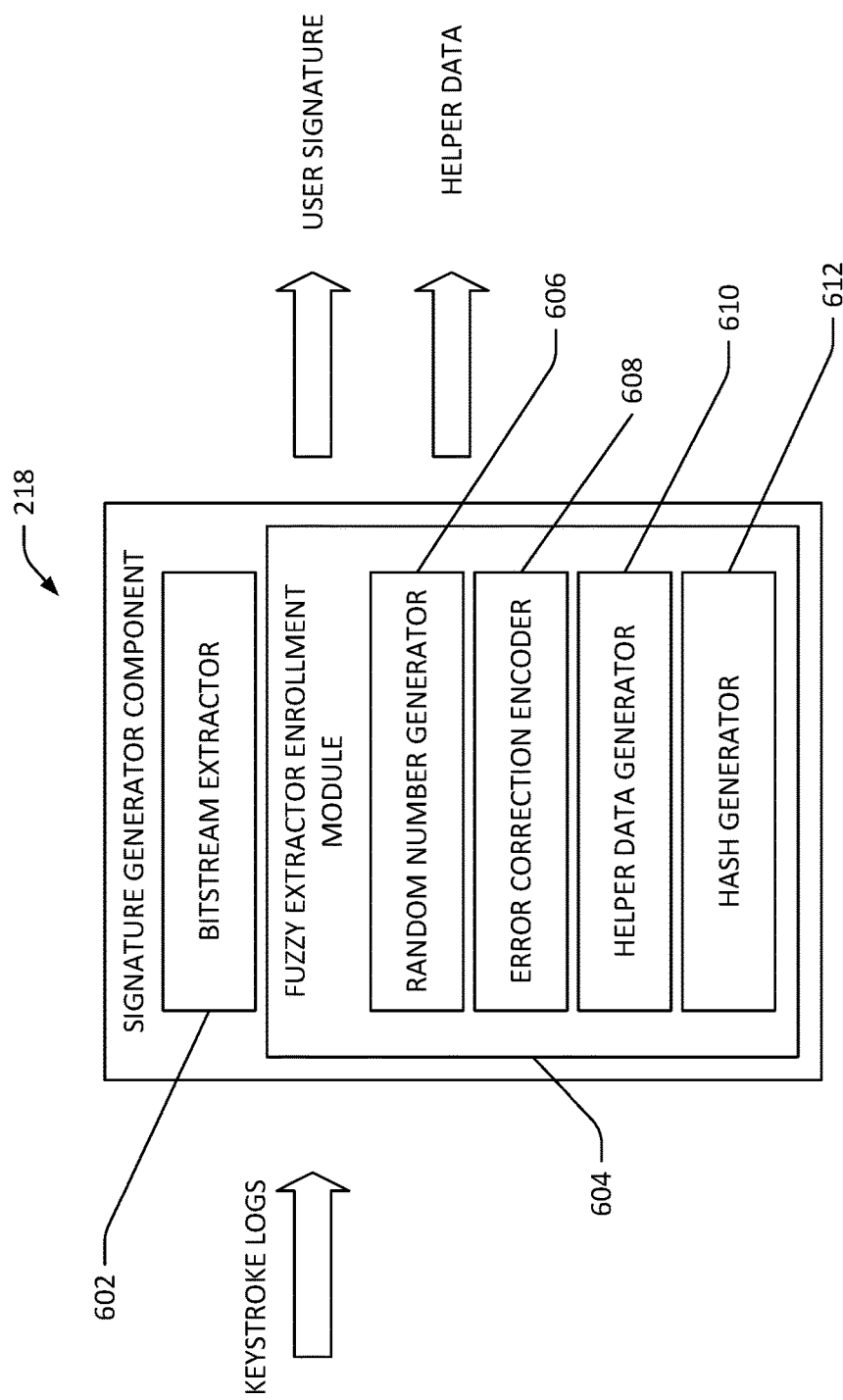
FIG. 6 illustrates an exemplary signature generator component.

Referring now to FIG. 6, an exemplary functional block diagram of the signature generator component 218 is illustrated. In the depicted example, the signature generator component 218 is configured to generate a user signature (during enrollment) based upon the bitstream. Specifically, the signature generator component 218 comprises a bitstream extractor 602, which performs actions 1-4) described above. Further, the signature generator component comprises a fuzzy extractor enrollment module 604. While keystroke dynamics can be used to authenticate users, it is contemplated that noise may exist in observed keystroke dynamics (e.g., during a computing session, the user 204 may take longer than usual or shorter than usual when setting forth a keystroke pattern while typing). The fuzzy extractor enrollment module 604 generates a user signature that is robust to noise. Fuzzy extraction was initially developed as an approach for generating keys from biometrics and other noisy data sources. Thus, a fuzzy extractor is well-suited in the context described above for the construction of signatures that are based upon keystroke dynamics.

The fuzzy extractor enrollment module 604 includes a random number generator 606 that generates a sequence of random bits. The fuzzy extractor enrollment module 604 further includes an error correction encoder 608 that receives the sequence of random bits and encodes the random bits using a suitable error correction scheme, thereby generating an error correction codeword. A helper data generator 610 receives the bitstream generated by the bitstream extractor 602 and the error correction codeword output by the error correction encoder 608 and generates helper data based upon the bitstream and the error correction codeword. In an example, the helper data generator 610 can combine the error correction codeword and the bitstream using an XOR to generate the helper data, which can be non-secret and publicly stored. The fuzzy extractor enrollment module 604 also includes a hash generator 612 that receives the bitstream and produces the user signature based upon the bitstream. For instance, the hash generator 612 can include a cryptographic hash function that receives the bitstream as input and outputs the user signature.

Figure 7:
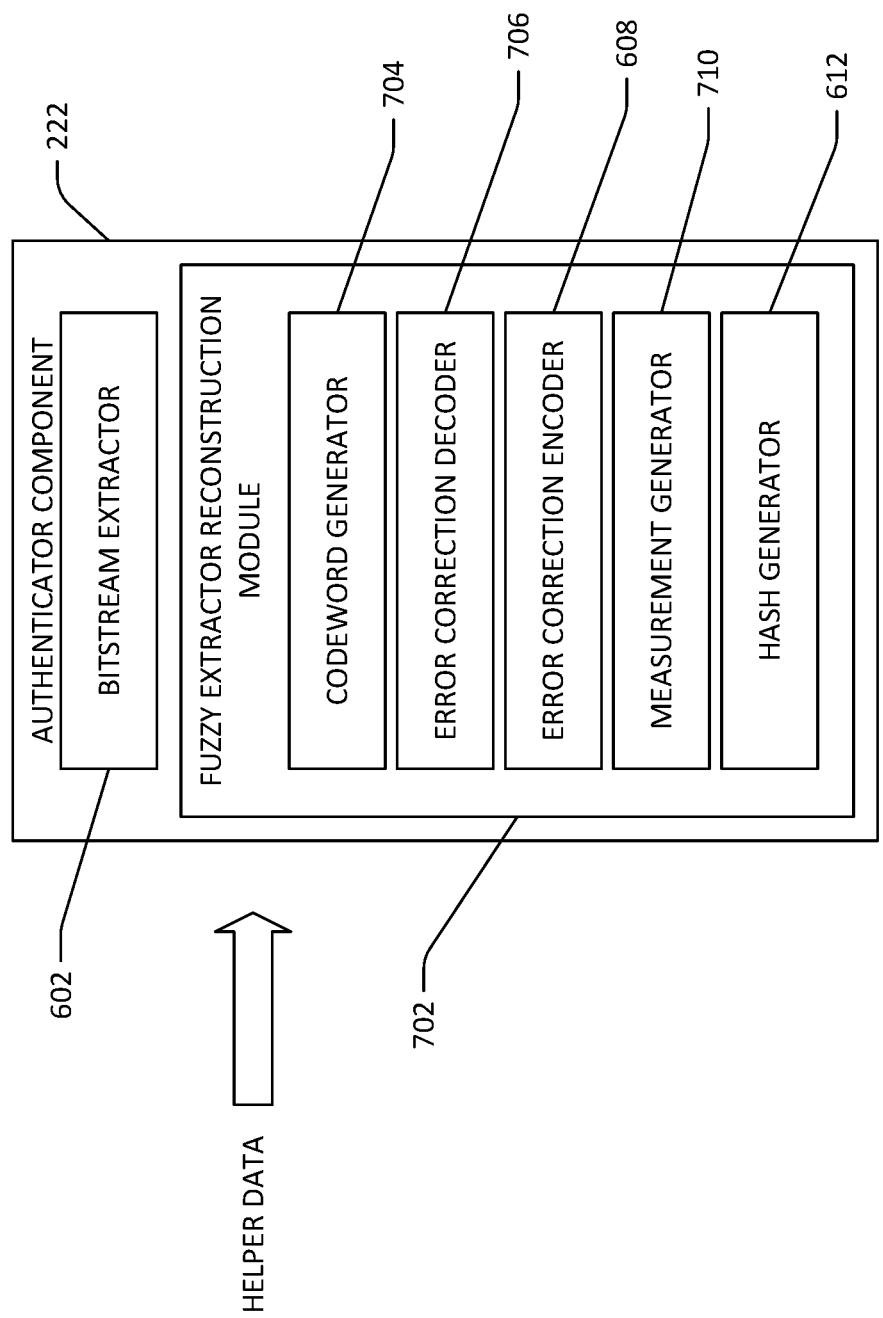
FIG. 7 illustrates an exemplary authenticator component.

Referring now to FIG. 7, an exemplary functional block diagram of the authenticator component 222 is illustrated, wherein the authenticator component 222 is configured to employ fuzzy extraction to construct the observed signature. The authenticator component 222 includes the bitstream extractor 602, which acts to generate a bitstream based upon keystroke dynamics (as the user 204 types on the keyboard 206). The authenticator component also includes a fuzzy extractor reconstruction module 702, which is configured to generate the observed signature based upon the (noisy) bitstream. The fuzzy extractor reconstruction module 702 includes a codeword generator 704 that receives the (noisy) bitstream and the helper data, and generates the error correction codeword (with some noise) based upon the bitstream and the helper data. Specifically, the codeword generator 704 can XOR the bitstream with the helper data to generate the error correction codeword with some noise. The fuzzy extractor reconstruction module 702 also includes an error correction decoder 706 that receives the (noisy) error correction codeword, which acts to remove the noise. The fuzzy extractor reconstruction module 702 further comprises the error correction encoder 608, which re-encodes the output of the error correction decoder 706 to recover the original codeword (e.g., the same codeword output by error correction encoder 608 in the fuzzy extraction enrollment module 604). The fuzzy extractor reconstruction module 702 also comprises a measurement generator 710 that receives the codeword output by the error correction encoder 608 as well as the helper data, and produces a second bitstream (which will match the bitstream generated by the signature generator component 218 when the user 204 is typing on the keyboard 206) based upon the codeword and the helper data. For instance, the measurement generator 710 can XOR the codeword with the helper data to generate the second bitstream. The fuzzy extraction reconstruction module 702 also comprises the hash generator 612 which generates the observed signature based upon the second bitstream output by the measurement generator 710 (where the hash generator 612 includes the cryptographic hash function used to generate the user signature). The authenticator component 222 compares the user signature (generated by the signature generator component 218) with the observed signature (generated by the authenticator component 222) to authenticate the user 204.

Figure 8:
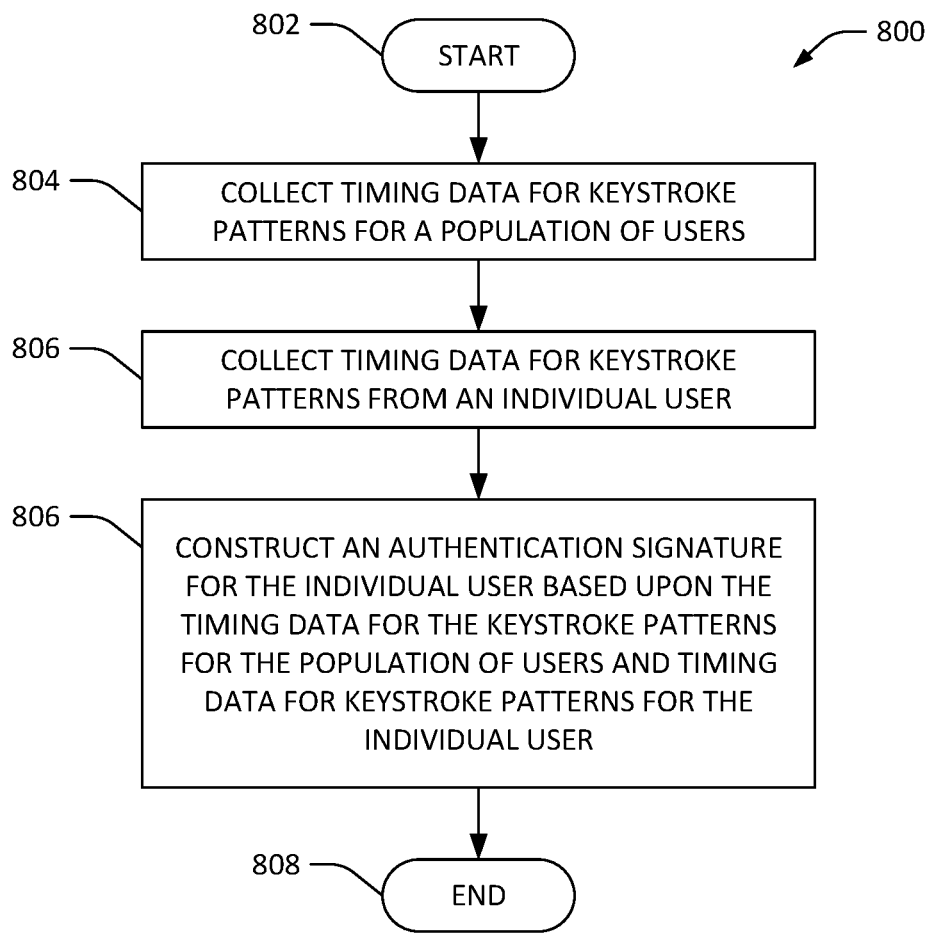
FIG. 8 illustrates an exemplary methodology relating to authenticating a user based upon keystroke dynamics for the user.
Figure 9:
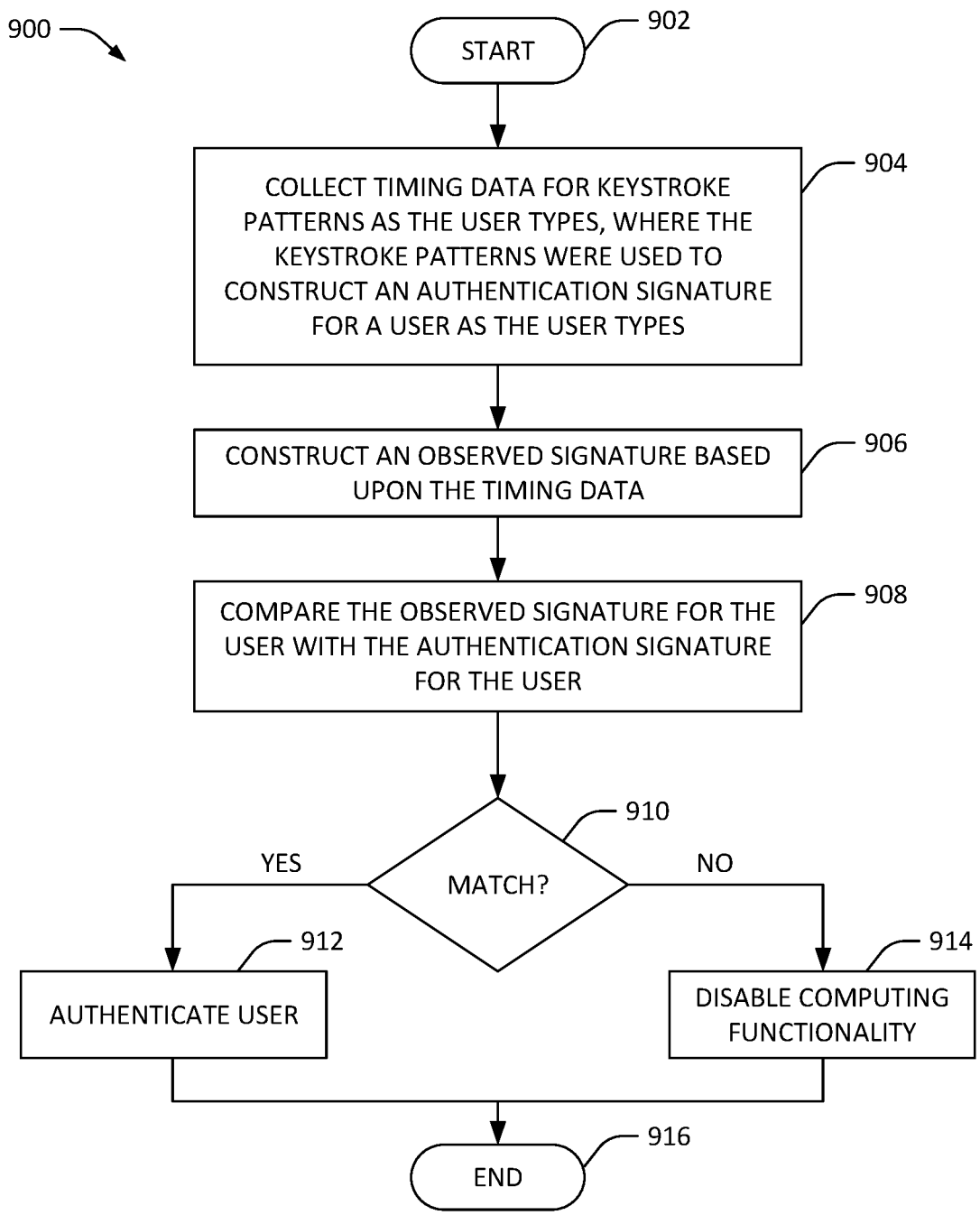
FIG. 9 illustrates an exemplary methodology relating to authenticating a user based upon keystroke dynamics for the user.

FIGS. 8 and 9 illustrate exemplary methodologies relating to authenticating a user based upon keystroke dynamics for the user. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference solely to FIG. 8, an exemplary methodology 800 for constructing an authentication signature for a user based upon keystroke dynamics of the user is illustrated, wherein the authentication signature is usable to authenticate the user as the user types on a keyboard. The methodology 800 starts at 802, and at 804 timing data for keystroke patterns for a population of users is collected. For example, this timing data can be collected for several hundred users, several thousand users, etc., where the timing data can be for one or more of the following patterns: press to press for key sequences, press to release for key sequences, release to press for key sequences, and/or release to release for key sequences. Additionally, statistics over this timing data can be generated, wherein, for example, average times for the patterns referenced above across the user population can be computed.

At 806, during an enrollment period (e.g., when a user is being enrolled with the authentication system but not currently being authenticated), timing data for the keystroke patterns are collected from the user. The timing data can be collective for some threshold number of keystrokes, over some threshold amount of time, etc. Further, statistics over this timing data for the user can be generated, wherein average times for the patterns referenced above for the user can be computed.

At 808, an authentication signature is constructed for the individual user based upon the timing data for the keystroke patterns for the population of users and the timing data for the keystroke patterns for the user who is being enrolled with the authentication system. For example, a threshold number of keystroke patterns can be identified, where times for such patterns are usable to differentiate the user from other users. As described above, in an example, a bitstream can be generated based upon comparisons between the user timing information for the identified keystroke patterns and the user population timing information for the identified keystroke patterns, and thereafter the authentication signature can be generated based upon such bitstream. Other approaches for using the timing information for keystroke patterns to generate an authentication signature for a user are also contemplated.

While the embodiments set forth above describe employment of user population data to generate signatures, it is to be understood that other approaches are also contemplated. For instance, if there is no user population data, timing information for keystroke patterns for only the user can be monitored and used to generate a signature for the user. For example, average times for keystroke patterns across all keystroke patterns can be computed, and keystroke patterns with times that deviate from the average can be identified as being useable to identify the user. The methodology 800 completes at 810.

Now referring to FIG. 9, an exemplary methodology 900 for authenticating a user based upon keystroke dynamics for the user is illustrated. The methodology 900 is performed after the methodology 800 has been completed (e.g., after the authentication signature for the user has been generated). The methodology 900 starts at 902, and at 904, timing data for keystroke patterns typed by the user is collected as the user types, where the keystroke patterns are those that were used to construct the authentication signature for the user. At 906, an observed signature is constructed based upon the timing data collected at 904. For example, the observed signature can be constructed by comparing the timing data collected at 904 with the statistics generated based upon the user population timing data collected at 804 (FIG. 8). Moreover, as described previously, fuzzy extraction can be employed in connection with generating the signature. At 908, the observed signature constructed at 906 is compared with the authentication signature constructed at 808 (FIG. 8). At 910, a determination is made regarding whether the observed signature matches the authentication signature. If it is determined that the signatures match, then at 912 the user is authenticated (e.g., the user is able to continue operating a computing device coupled to a keyboard being employed by the user). If it is determined, however, that the signatures do not match, then at 914 some computing functionality is disabled, as the user who is typing on the keyboard is not the same user who enrolled with the authentication system. The methodology 900 completes at 916.

Figure 10:
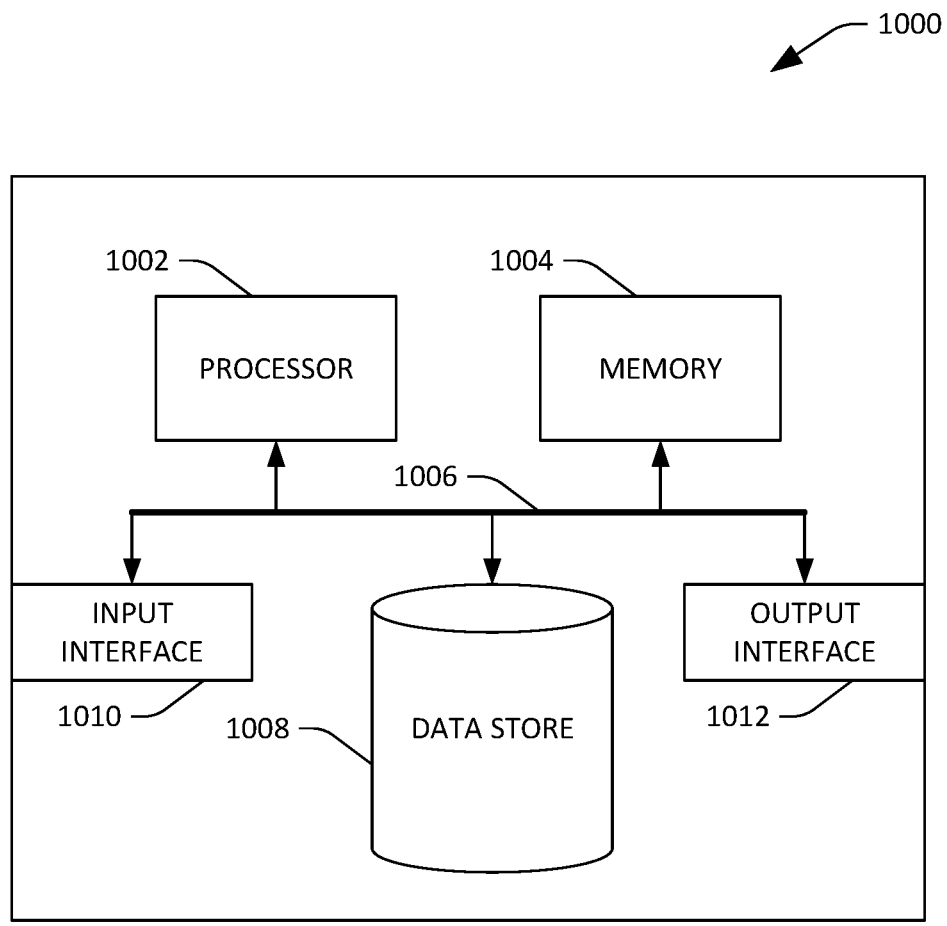
FIG. 10 illustrates an exemplary computing device that can be used in accordance with the systems and methodologies disclosed herein.

Referring now to FIG. 10, a high-level illustration of an exemplary computing device 1000 that can be used in accordance with the systems and methodologies disclosed herein is illustrated. For instance, the computing device 1000 may be used in a system that supports mapping queries to topics. By way of another example, the computing device 1000 can be used in a system that supports identifying web pages referenced in social media messages. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store message feeds of social media accounts, a database that maps topics to social media accounts, etc.

The computing device 1000 additionally includes a data store 1008 that is accessible by the processor 1002 by way of the system bus 1006. The data store 1008 may include executable instructions, the above-mentioned database, social media content, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system that is configured to authenticate a user of a computing device as the user is typing on a keyboard, the system comprising:
   a processor; and
   memory that stores instructions that, when executed by the processor, cause the processor to perform acts comprising:
      constructing an observed signature for the user based upon a first amount of time taken by the user to complete a keystroke pattern, the first amount of time measured as at least one keystroke associated with the keystroke pattern is set forth by the user as the user is typing on the keyboard, wherein constructing the observed signature comprises:
         constructing a bitstream that comprises a bit value that is assigned to the keystroke pattern, wherein the bit value indicates whether the first amount of time taken by the user to complete the keystroke pattern is greater than an average amount of time taken by multiple users to complete the keystroke pattern;
         generating a cryptographic key based upon the bitstream; and
         generating the observed signature based upon the cryptographic key;
      comparing the observed signature for the user with an authentication signature for the user, the authentication signature previously constructed based upon a second amount of time previously taken by the user to complete the keystroke pattern, the second amount of time measured when the user previously typed on the keyboard; and
      authenticating the user of the computing device based upon the comparing of the observed signature of the user with the authentication signature for the user such that the computing device continues to permit the user to control at least one operation of the computing device.

2. The system of claim 1, the acts further comprising:
   receiving a username and password for the user;
   authenticating the user for a computing session based upon the username and password, wherein the observed signature is constructed during the computing session subsequent to the user being authenticated based upon the username and password.

3. The system of claim 1, wherein the keystroke pattern includes a press of a first key followed by a press of a second key, and the first amount of time is a time between the press of the first key and the press of the second key, wherein no other keys were pressed between when the first key and the second key were pressed.

4. The system of claim 1, wherein the keystroke pattern includes a release of a first key followed by a release of a second key, and the first amount of time is a time between the release of the first key and the release of the second key, wherein no other keys were pressed between when the first key and the second key were pressed.

5. The system of claim 1, wherein the keystroke pattern includes a press of a first key followed by a release of a second key, and the first amount of time is a time between the press of the first key and the release of the second key, wherein no other keys were pressed between when the first key and the second key were pressed.

6. The system of claim 1, wherein the keystroke pattern includes a release of a first key followed by a press of a second key, and the first amount of time is a time between the release of the first key and the press of the second key, wherein no other keys were pressed between when the first key and the second key were pressed.

7. The system of claim 1, wherein the bitstream comprises multiple bits that are respectively assigned to different keystroke patterns.

8. The system of claim 1, wherein constructing the observed signature comprises using fuzzy extraction on the bitstream to construct the observed signature.

9. A method, comprising:
during a first computing session of a user with a computing device, constructing an observed signature for the user based upon a first amount of time taken by the user to complete a predefined keystroke pattern as the user is typing on a keyboard, wherein constructing the observed signature for the user comprises:
constructing a bitstream that includes a bit value that is assigned to the predefined keyboard pattern, wherein the bit value indicates whether the first amount of time taken by the user to complete the predefined keystroke pattern is greater than an average amount of time taken by a set of users in a population to complete the predefined keystroke pattern;
generating a cryptographic key based upon the bitstream; and
generating the observed signature based upon the cryptographic key;
comparing the observed signature for the user with an authentication signature for the user, the authentication signature previously constructed based upon a second amount of time taken by the user to complete the predefined keystroke pattern, the second amount of time captured when the user previously typed on the keyboard during a second computing session that is different from the first computing session; and
authenticating the user of the computing device based upon the comparing of the observed signature of the user with the authentication signature for the user, wherein the computing device continues to permit the user to control at least one operation of the computing device based upon the authenticating of the user of the computing device.

10. The method of claim 9, further comprising:
receiving a username and password for the user;
authenticating the user for a computing session based upon the username and password, wherein the observed signature is constructed during the first computing session subsequent to the user being authenticated based upon the username and password.

11. The method of claim 9, wherein the keystroke pattern is a press of a first key followed by a press of a second key, and the first amount of time is a time between the press of the first key and the press of the second key, wherein no other keys were pressed between when the first key and the second key were pressed.

12. The method of claim 9, wherein the keystroke pattern is a release of a first key followed by a release of a second key, and the first amount of time is a time between the release of the first key and the release of the second key, wherein no other keys were pressed between when the first key and the second key were pressed.

13. The method of claim 9, wherein the keystroke pattern is a press of a first key followed by a release of a second key, and the first amount of time is a time between the press of the first key and the release of the second key, wherein no other keys were pressed between when the first key and the second key were pressed.

14. The method of claim 9, wherein the keystroke pattern is a press of a key followed by a release of the key, and the first amount of time is a time between the press of the key and the release of the key, wherein no other keys were pressed between when the key was pressed and released.

15. The method of claim 9, wherein the bitstream comprises multiple bits that are respectively assigned to different keystroke patterns.

16. The method of claim 15, wherein constructing the observed signature comprises using fuzzy extraction on the bitstream to construct the observed signature.

17. A computer-readable storage medium comprising instructions that, when executed by a processor, cause the processor to perform acts comprising:
during a first computing session of a user with a computing device, constructing an observed signature for the user based upon a first amount of time taken by the user to complete a predefined keystroke pattern as the user is pressing keys on a keyboard, wherein constructing the observed signature comprises:
constructing a bitstream that includes a bit value that is assigned to the predefined keyboard pattern, wherein the bit value indicates whether the first amount of time taken by the user to complete the predefined keystroke pattern is greater than an average amount of time taken by a set of users in a population to complete the predefined keystroke pattern;
generating a cryptographic key based upon the bitstream; and
generating the observed signature based upon the cryptographic key;
comparing the observed signature for the user with an authentication signature for the user, the authentication signature previously constructed based upon a second amount of time taken by the user to complete the predefined keystroke pattern, the second amount of time captured when the user previously typed on the keyboard during a second computing session with the computing device that is different from the first computing session; and
authenticating the user of the computing device based upon the comparing of the observed signature of the user with the authentication signature for the user, wherein the computing device continues to permit the user to control at least one operation of the computing device responsive to authenticating the user.

18. The computer-readable storage medium of claim 17, wherein the authentication signature is based upon a second bitstream that has a second bit value that is assigned to the predefined keystroke patterns, and further wherein the user is authenticated based upon the second bit value in the second bitstream being equivalent to the bit value in the bitstream.

19. The computer-readable storage medium of claim 18, the acts further comprising:
  receiving a username and password for the user;
  authenticating the user for the first computing session based upon the username and password, wherein the observed signature is constructed subsequent to the user being authenticated based upon the username and password.

20. The computer-readable storage medium of claim 17, wherein constructing the observed signature comprises using fuzzy extraction on the bitstream to construct the observed signature.

* * * * *